(12) United States Patent
Bell (10) Patent No.: US 8,041,077 B2
(45) Date of Patent: Oct. 18, 2011

(54) METHOD OF MOTION DETECTION AND AUTONOMOUS MOTION TRACKING USING DYNAMIC SENSITIVITY MASKS IN A PAN-TILT CAMERA

(75) Inventor: Mark Steven Bell, Airville, PA (US)

(73) Assignee: Robert Bosch GmbH, Stuttgart (DE)

( * ) Notice: Subject to any disclaimer, the term of this patent is extended or adjusted under 35 U.S.C. 154(b) by 958 days.

(21) Appl. No.: 11/958,959

(22) Filed: Dec. 18, 2007

(65) Prior Publication Data

US 2009/0154768 A1    Jun. 18, 2009

(51) Int. Cl.
G06K 9/00 (2006.01)
H04N 7/18 (2006.01)
(52) U.S. Cl. .................... 382/103; 382/219; 348/155
(58) Field of Classification Search .............. 382/100, 382/103, 106, 107, 162, 165, 166, 168, 172, 382/173, 181, 194, 199, 219, 232, 254, 274, 382/276, 291, 305, 312; 396/429; 348/208.1, 348/219.1, 155
See application file for complete search history.

(56) References Cited

U.S. PATENT DOCUMENTS

| | | | | |
|---|---|---|---|---|
| 5,157,732 | A * | 10/1992 | Ishii et al. | 382/107 |
| 5,898,459 | A * | 4/1999 | Smith et al. | 348/219.1 |
| 5,982,909 | A * | 11/1999 | Erdem et al. | 382/103 |
| 6,954,226 | B2 * | 10/2005 | Hsieh et al. | 348/208.1 |
| 7,190,263 | B2 | 3/2007 | McKay et al. | |
| 7,280,753 | B2 * | 10/2007 | Oya et al. | 396/429 |
| 7,777,780 | B2 * | 8/2010 | Oya et al. | 348/208.1 |
| 2004/0212677 | A1 | 10/2004 | Uebbing | |
| 2004/0227817 | A1 * | 11/2004 | Oya et al. | 348/155 |
| 2007/0061696 | A1 | 3/2007 | Vallone et al. | |

\* cited by examiner

*Primary Examiner* — Seyed Azarian
(74) *Attorney, Agent, or Firm* — Taft Stettinius & Hollister LLP; Keith Swedo (57) ABSTRACT

A method of identifying motion within a field of view includes capturing at least two sequential images within the field of view. Each of the images includes a respective array of pixel values. An array of difference values between corresponding ones of the pixel values in the sequential images is calculated. A sensitivity region map corresponding to the field of view is provided. The sensitivity region map includes a plurality of regions having different threshold values. A presence of motion is determined by comparing the difference values to corresponding ones of the threshold values.

16 Claims, 8 Drawing Sheets

METHOD OF MOTION DETECTION AND AUTONOMOUS MOTION TRACKING USING DYNAMIC SENSITIVITY MASKS IN A PAN-TILT CAMERA

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright©2007, Robert Bosch LLC, All Rights Reserved.

BACKGROUND OF THE INVENTION

1. Field of the Invention

The present invention relates to surveillance systems, and, more particularly, to surveillance systems for detecting and tracking a moving object or being.

2. Description of the Related Art

Surveillance systems, also known as security systems, are known to include cameras for capturing images within the camera's field of view. The captured images may be compared with each other in order to find differences that may indicate movement of an object or movement of a being within the field of view. The camera may be equipped with mechanisms that enable the camera to execute pan and tilt movements, thereby shifting the camera's field of view. Thus, it is possible to shift the camera's field of view such that a moving object/being of interest may be kept within the field of view. In this way, the surveillance system may continuously and automatically detect and track the movement of the object or being.

SUMMARY OF THE INVENTION

The present invention provides an improved method of motion detection in which color values of corresponding pixels in sequentially captured images are compared to each other. If the differences between the color values of the corresponding pixels exceed a threshold value, then it may be decided that motion has occurred within the field of view. According to the invention, the threshold values corresponding to the various pixel locations are not all the same, i.e., the threshold values are not all equal.

Terms such as "color values", "color pixels", and other references to "color" are used extensively herein. It is to be understood that these terms and references to "color" encompass more than hue. For example, "color value" encompasses values of lightness, chroma, or values associated with any other color space conventions such as $L^*a^*b^*$, $L^*u^*v^*$, and HSI, to name a few. That is, "color values" may include lumina values, z chroma values, or any combination of these or other values mentioned above. In one embodiment of the present invention, only lumina values are employed.

A Sensitivity Region Map may be assigned threshold values corresponding to a set of pixels for displaying an image. More particularly, the Sensitivity Region Map may specify the threshold values that correspond to each pixel location in the field of view of the camera. The Sensitivity Region Map may delineate continuous groups of pixel locations within the field of view that correspond to a same threshold value. To this end, the Sensitivity Region Map may include a "Background Region" and other user-defined regions (i.e., masks). A same threshold value may apply to each pixel location corresponding to a same region. User-defined regions may have the shapes of closed polygons. Each mask or "region" may be defined by its vertices (e.g., corners), a dynamic flag, and a numeric threshold value. If the dynamic flag is set, the color values of all pixels within, i.e., corresponding to, the region may be included in a computation of a dynamic threshold. A new value for the dynamic threshold may be calculated with each newly captured image, as the pixels of each newly captured image may have a unique set of color values. If the dynamic flag is not set, a fixed numeric threshold value may be applied to the pixels corresponding to the region. Thus, a different threshold value may be specified, or calculated, for each region of the Sensitivity Region Map.

The invention comprises, in one form thereof, a method of identifying motion within a field of view. At least two sequential images are captured within the field of view. Each of the images includes a respective array of pixel values. An array of difference values between corresponding ones of the pixel values in the sequential images is calculated. A sensitivity region map corresponding to the field of view is provided. The sensitivity region map includes a plurality of regions having different threshold values. A presence of motion is determined by comparing the difference values to corresponding ones of the threshold values.

The invention comprises, in another form thereof, a method of identifying motion within a field of view, including capturing at least two sequential images within the field of view. Each of the images includes a respective array of pixel values. Difference values between corresponding ones of the pixel values in the sequential images are calculated. A sensitivity region map corresponding to the field of view is provided. The sensitivity region map includes a plurality of regions. At least one of the regions has a threshold value dependent upon a corresponding group of the pixel values in at least one of the sequential images. A presence of motion is determined by comparing the difference values corresponding to the at least one region to the threshold value of the at least one region.

The invention comprises, in yet another form thereof, a method of identifying motion within a field of view, including capturing at least two sequential images within the field of view. Each of the images includes a respective array of pixel values. Difference values between corresponding ones of the pixel values in the sequential images are calculated. A sensitivity region map corresponding to the field of view is provided. The sensitivity region map includes a plurality of regions. It is decided whether to assign at least one of the regions a fixed threshold value or a variable threshold value. The variable threshold value is dependent upon a corresponding group of the pixel values in a corresponding one of the sequential images. The decision whether to assign a fixed or variable threshold value is dependent upon an expected variability of the pixel values in a portion of the field of view. The portion of the field of view corresponds to the at least one region. A presence of motion is determined by comparing the difference values corresponding to the at least one region to the threshold value of the at least one region.

An advantage of the present invention is that different threshold values may be applied to different groups of pixel locations within the camera's field of view. Because different groups of pixels have different characteristics, the ability to apply different threshold values to the pixels may result in more accurate detection of motion.

Another advantage is that, because different threshold values are best suited for use in detecting different types of motion, the ability to apply different threshold values to the pixels may result in more accurate detection of different types of motion in different areas of the field of view.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Some portions of the following description are presented in terms of algorithms and operations on pixels, i.e., picture elements. The algorithms and operations may also be described as being performed on numeric color values that are associated with the pixels to thereby form an image. It has proven convenient, primarily for reasons of common usage among those skilled in the art, to describe the invention in terms of pixels and values such as color values and threshold values. It is to be understood, however, that these and similar terms are to be associated with appropriate physical elements and/or visual characteristics, and are merely convenient labels applied to these physical elements and/or visual characteristics. Unless otherwise stated herein, or apparent from the description, terms such as "calculating", "determining", "displaying", "processing" or "computing", or similar terms, refer the actions of a computing device that may perform these actions automatically, i.e., without human intervention, after being programmed to do so.

Figure 1:
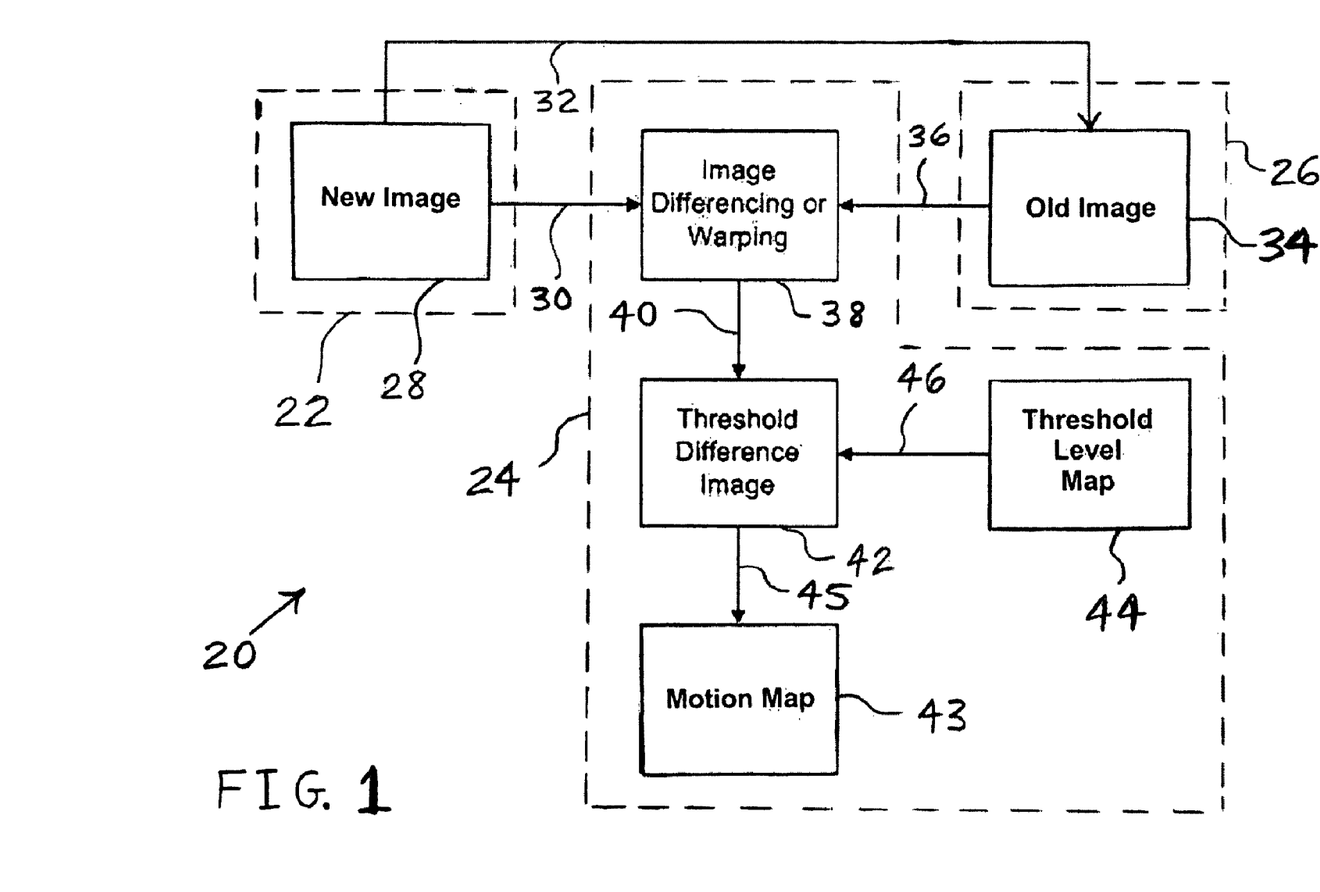
FIG. 1 is a block diagram of one embodiment of a surveillance system of the present invention, including illustrations of data flow within the system.

Referring now to the drawings and particularly to FIG. 1, there is shown one embodiment of a security surveillance system 20 of the present invention including a camera 22, a processor 24 and a memory device 26. In one embodiment, camera 22 may be capable of panning, tilting and/or zooming in order to change the camera's field of view. Images captured by camera 22, such as new image 28, may be pixelized, i.e., formed of two-dimensional arrays of picture elements or "pixels" that may each be characterized by a respective color value. In one embodiment, the color value is defined in the HSB color space to include a hue value, a saturation value, and/or a brightness value.

Data in the form of images captured by camera 22 may be transmitted to processor 24, as indicated at 30. Images captured by camera 22 may also be transmitted to, and stored in, memory device 26, as indicated at 32. Data in the form of old images 34, i.e., images that are not the most recent image, may be transmitted to processor 24, as indicated at 36. In one embodiment, the image most recently received by memory 26 is transmitted to processor 24.

As indicated in FIG. 1, both a new image 28 and old image 34 may be used by processor 24 in an image differencing or "warping" process 38. In one embodiment, image differencing process 38 includes a pixel-by-pixel comparison between new image 28 and old image 34. Specifically, image differencing process 38 may include calculating a numerical difference between the color values of each pair of corresponding pixels in new image 28 and old image 34. The result of image differencing process 38, indicated at 40 in FIG. 1, may be an array of difference values wherein each difference value may correspond to a respective pixel location in both new image 28 and old image 34.

Result 40 of image differencing process 38 may be used in a threshold difference image process 42. An array of data in the form of a threshold level map 44 may also be used in threshold difference image process 42, as indicated at 46. Threshold difference image 42 may be processed by any of various possible criteria to arrive at a motion map 43, as indicated at 45. Motion map 43 may be indicative of where in the field of view that motion is occurring.

Figure 2:
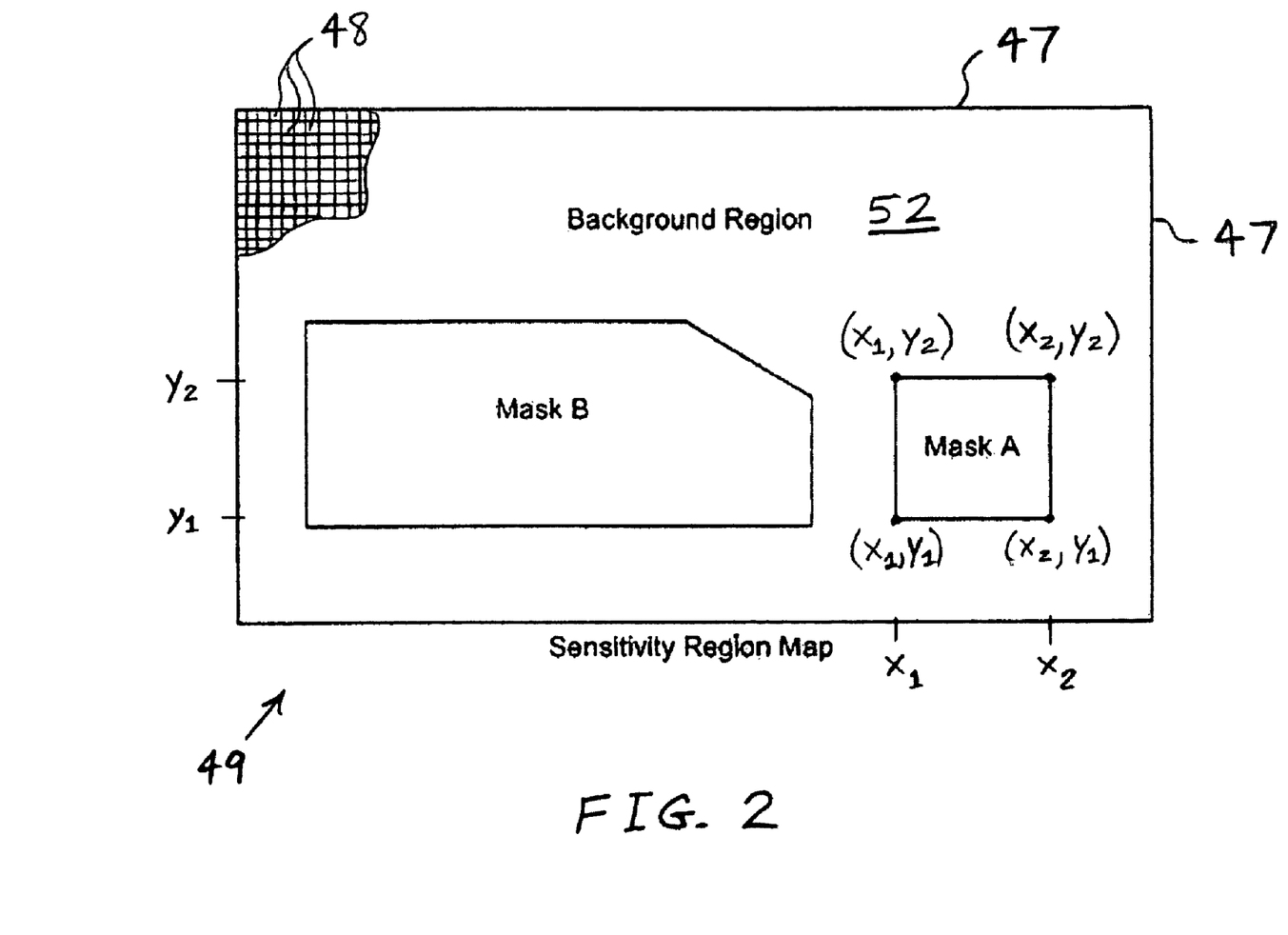
FIG. 2 is a diagram of one embodiment of a Sensitivity Region Map suitable for use in the surveillance system of FIG. 1.

Threshold level map 44 may created based upon a Sensitivity Region Map 49, an example of which is illustrated in FIG. 2. The Sensitivity Region Map includes a two-dimensional array of map locations 48 bounded by a rectangular boundary 47. Each of map locations 48 may be provided with a respective threshold value. Each of map locations 48 corresponds to a respective pixel location in or proximate a field of view 50 (FIG. 3) of camera 22.

The Sensitivity Region Map includes a background region 52 surrounding each of two other regions in the form of mask A and mask B. Each of the threshold values associated with background region 52 may be the same fixed value, i.e., may be equal. Each of mask A and mask B may be shaped as a closed polygon and may be defined by the user/operator. In one embodiment, each of the threshold values within mask A are equal, and each of the threshold values within mask B are equal. However, the threshold values within mask A are not typically equal to the threshold values within mask B. Nor are the threshold values within mask A or mask B typically equal to the threshold values within background region 52. Moreover, it is possible for the threshold values within mask A to be variable rather than fixed. It is also possible for the threshold values within mask B to be variable rather than fixed.

In one embodiment, each of the polygon-shaped regions, mask A and mask B, may have its own threshold value associated with it. The threshold values assigned to the polygon-shaped regions may be dynamically computed for each video frame (i.e., for each newly captured image), may be specified by the human operator, or may be specified by the condition of the system. The size or area of the given region, such as mask A or mask B, relative to that of the Sensitivity Region Map as a whole may be dynamically scaled based upon the current focal length of camera 22.

Each mask, e.g., masks A and B, may be defined by its vertices (e.g., corners), a dynamic flag, and a numeric threshold value. For example, the polygon shape of mask A may be defined by its four corners $(x_1, y_1)$, $(x_2, y_1)$, $(x_1, y_2)$, and $(x_2, y_2)$. Sensitivity Region Map 49 is described herein as including two masks. However, it is to be understood that the number of masks included within the Sensitivity Region Map may be one or any other number within the scope of the invention.

Each mask may have a respective dynamic flag that has two different states, i.e., set or not set. If the dynamic flag is set, the color values of all pixels within, i.e., corresponding to, the region may be included in a computation of a dynamic threshold. For example, assume that the dynamic flag associated with mask A is set, and that mask A corresponds to the area in and around a doorway 54 (FIG. 3) in field of view 50, wherein the area in and around a doorway 54 is affected by changing lighting conditions. More particularly, assume that field of view 50 is a view from inside a building, and that an outdoor environment may be viewed through doorway 54. Although there may be some artificial light provided within the building and near doorway 54, the captured color values corresponding to mask A, and the range of such captured color values, may differ widely between images captured in daylight and images captured at night. Using a dynamically computed threshold value based upon the pixels disposed only in this area of the field of view may yield superior ability to detect motion as compared with using a threshold value based upon all pixels in the image. For example, the range of captured color values in and around doorway 54 may be greater during daylight conditions than at night. Thus, it may be advantageous to compare the difference in color values between pixels of sequentially captured images to a larger mask A threshold value during the daytime than at night when detecting the presence of motion in and around doorway 54.

Figure 3:
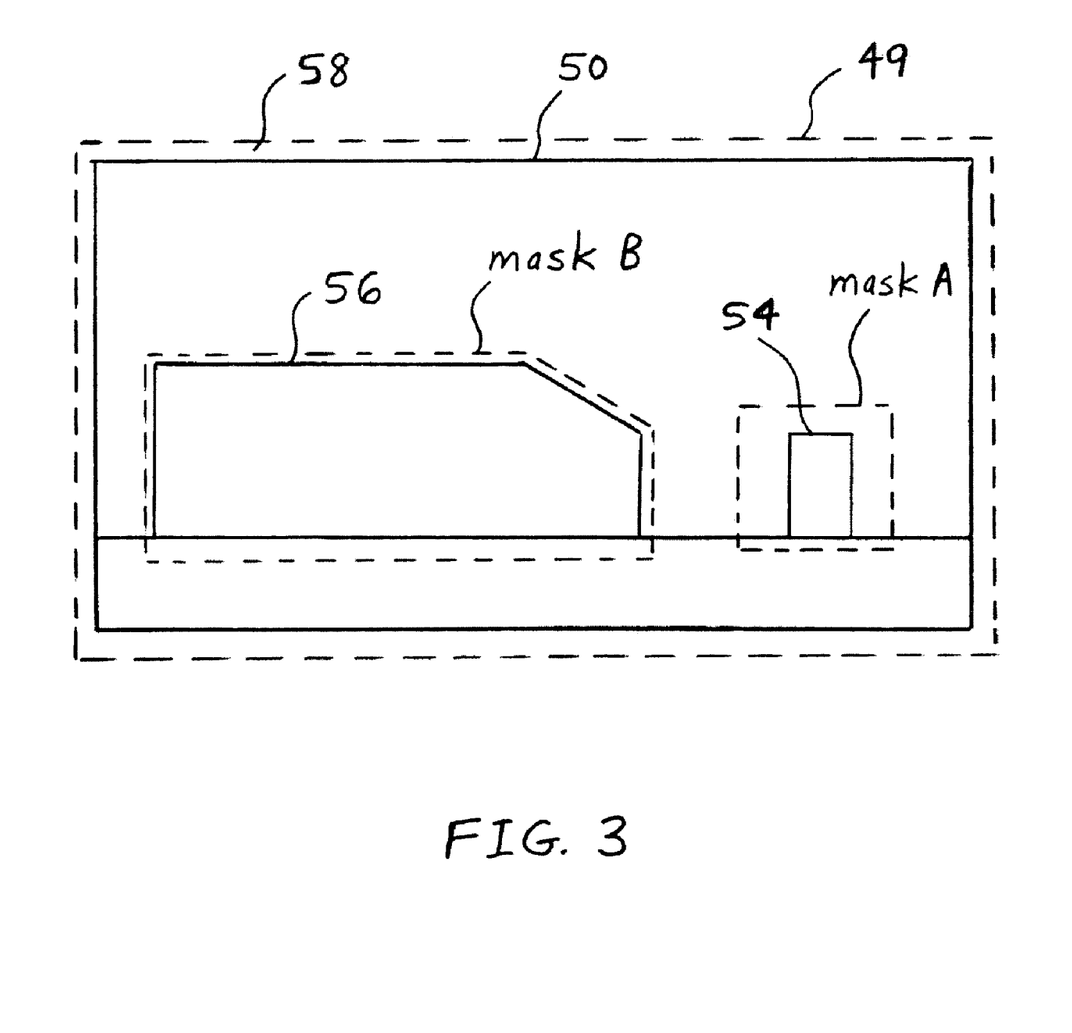
FIG. 3 is a diagram of one embodiment of a field of view of the camera of the surveillance system of FIG. 1 with the Sensitivity Region Map of FIG. 2 superimposed thereon.

The value of the variable threshold associated with mask A may vary with the measured color values of the portion of the image that is in and around doorway 54. That is, although it is possible and within the scope of the invention for the threshold values to vary with time of day, it is also possible and within the scope of the invention for the threshold values to vary with the color values of recently captured images. In one embodiment, a new value for the dynamic threshold may be calculated with each newly captured image, as the pixels of each newly captured image may have a unique set of color values.

If the dynamic flag associated with a mask is not set, a fixed numeric threshold value may be applied to the pixels corresponding to the mask. However, the fixed numeric threshold value may be calculated based upon color values of images captured during some sample time period. Alternatively, the user may set the fixed threshold value associated with any mask based upon any other factors or data that the user chooses.

As another example, assume that mask B corresponds to the area in and around a vehicle exit portal 56 (FIG. 3) that is adjacent to doorway 54 in field of view 50. Assume that the user is not interested in detecting movement of objects or beings of relatively small size, such as pedestrian traffic, through portal 56, but is interested in detecting movement of objects or beings of relatively large size, such as vehicular traffic, through portal 56. Movement of a larger object, such as a vehicle, will yield a larger change in pixel color values than will movement of a small object, such as a human being. Thus, use of a specific or fixed threshold value in association with mask B that decreases sensitivity for only the region of mask B may enable detection of vehicle traffic through portal 56 while avoiding detection of pedestrian traffic through portal 56. For example, a larger threshold value may result in less sensitivity to pedestrian traffic than would a smaller threshold value. Thus, a larger threshold value may be more suitable for determining a presence of vehicular motion than for determining a presence of pedestrian motion. Moreover, the superior detection capability yielded by the dynamically computed threshold value associated with mask A is unaffected by use of the fixed threshold value in association with mask B.

The portion of the field of view associated with mask B may have a higher likelihood of vehicle motion and/or a lower likelihood of pedestrian motion than another portion of the field of view, such as the background region. Thus, the threshold value assigned to mask B may be greater than the threshold value assigned to the background region such that the surveillance system is better able to distinguish vehicular motion from pedestrian motion in the portion of the field of view corresponding to mask B than in the portion of the field of view corresponding to the background region.

As for the threshold value associated with background region 52, either a fixed threshold value or a dynamically computed threshold value may be used. If the threshold value is variable, then it may be computed based upon all pixel color values in a recently or most recently acquired image, for example. Alternatively, the variable threshold value may be computed based upon pixel color values corresponding to background region 52 in a recently or most recently acquired image. A fixed threshold value for background region 52 may be calculated based on pixel color values in any portion(s) of one or more captured images, for example. It is also possible for the user to select the threshold value associated with background region 52 based upon any criteria he chooses.

As illustrated in FIG. 3, a portion 58 of Sensitivity Region Map 49 may extend beyond the current field of view 50 of camera 22. Although threshold values within portion 58 may not be used to determine the presence of motion within field of view 50 in its state as shown in FIG. 3, some of the threshold values within portion 58 may become active in the event that field of view 50 shifts. For example, field of view 50 may shift when camera 22 pans, tilts and/or zooms in order to keep a moving object or being within field of view 50.

Figure 4:
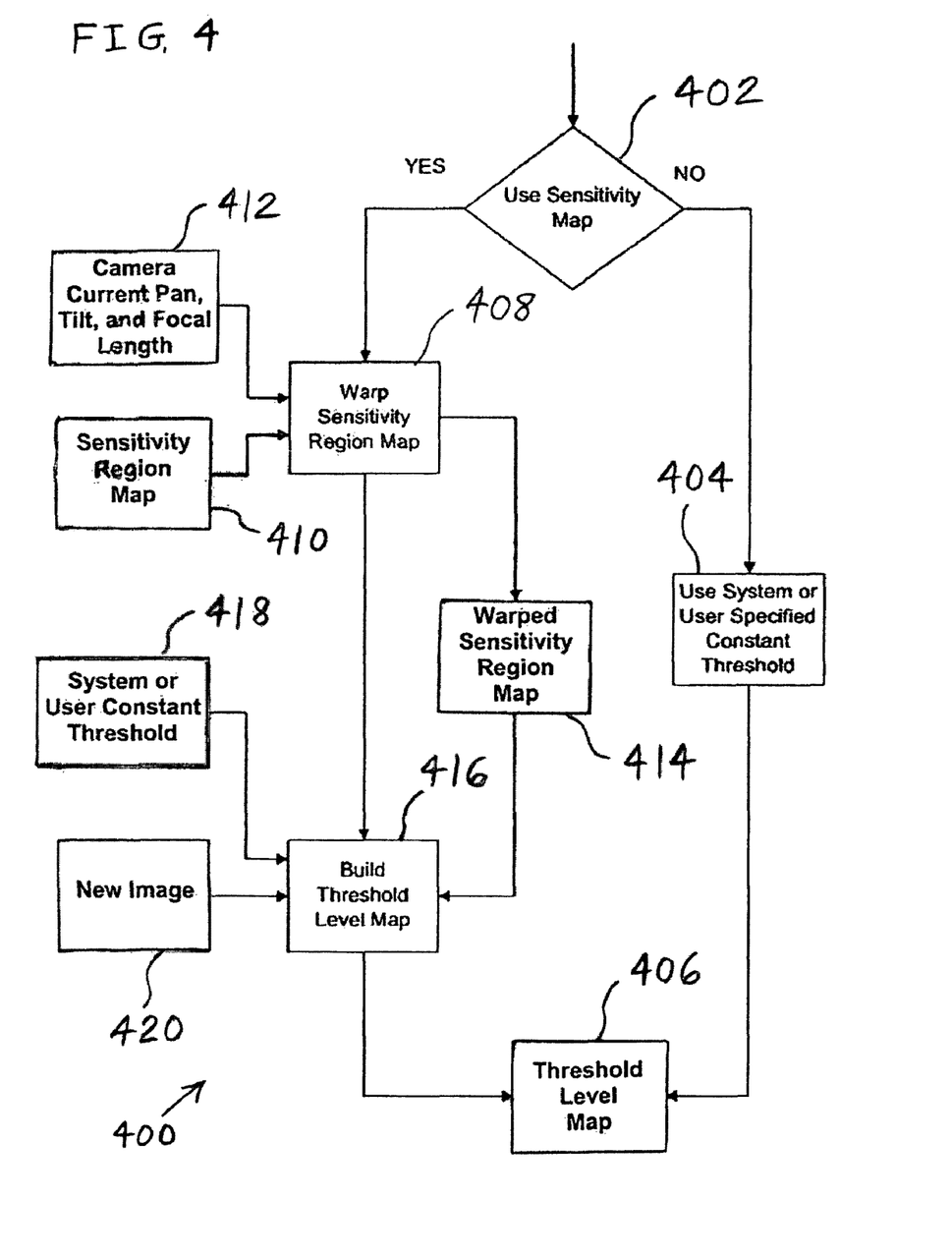
FIG. 4 is a flow diagram illustrating one embodiment of a process of the present invention by which a Sensitivity Region Map, such as shown in FIG. 2, may be utilized to build a Threshold Level Map such as shown in FIG. 1.

FIG. 4 illustrates one embodiment of a process 400 by which a Sensitivity Region Map may be utilized to build a Threshold Level Map for a video image. In a first step 402, it is determined whether a Sensitivity Region Map is to be used. This may be a decision that an installer makes based upon the characteristics of the environment in which the surveillance system is to be installed. In one embodiment, the decision is made automatically by the system itself, perhaps based upon pixel color values of images captured during a system initialization process. If it is determined in step 402 that a Sensitivity Map will not be used, then the system or the user specifies a constant, i.e., fixed, threshold value (step 404) that will be compared to all pixel difference color values from the captured images. The constant threshold value is used as each of the values that are included in the Threshold Level Map (step 406). If it is determined in step 402 that a Sensitivity Map will be used, then a Sensitivity Region Map is warped in step 408. The form of the Sensitivity Region Map 410 may be modified by the current pan, tilt and/or focal length (zoom) positions 412 of camera 22. The resulting Warped Sensitivity Region Map 414 is then used as a format or template in the step 416 of building the Threshold Level Map. Also used in step 416 in one embodiment are constant threshold values 418 that may be specified by the surveillance system and/or by the user.

Newly captured images 420 are also used to build and/or calculate the Threshold Level Map.

Figure 5:
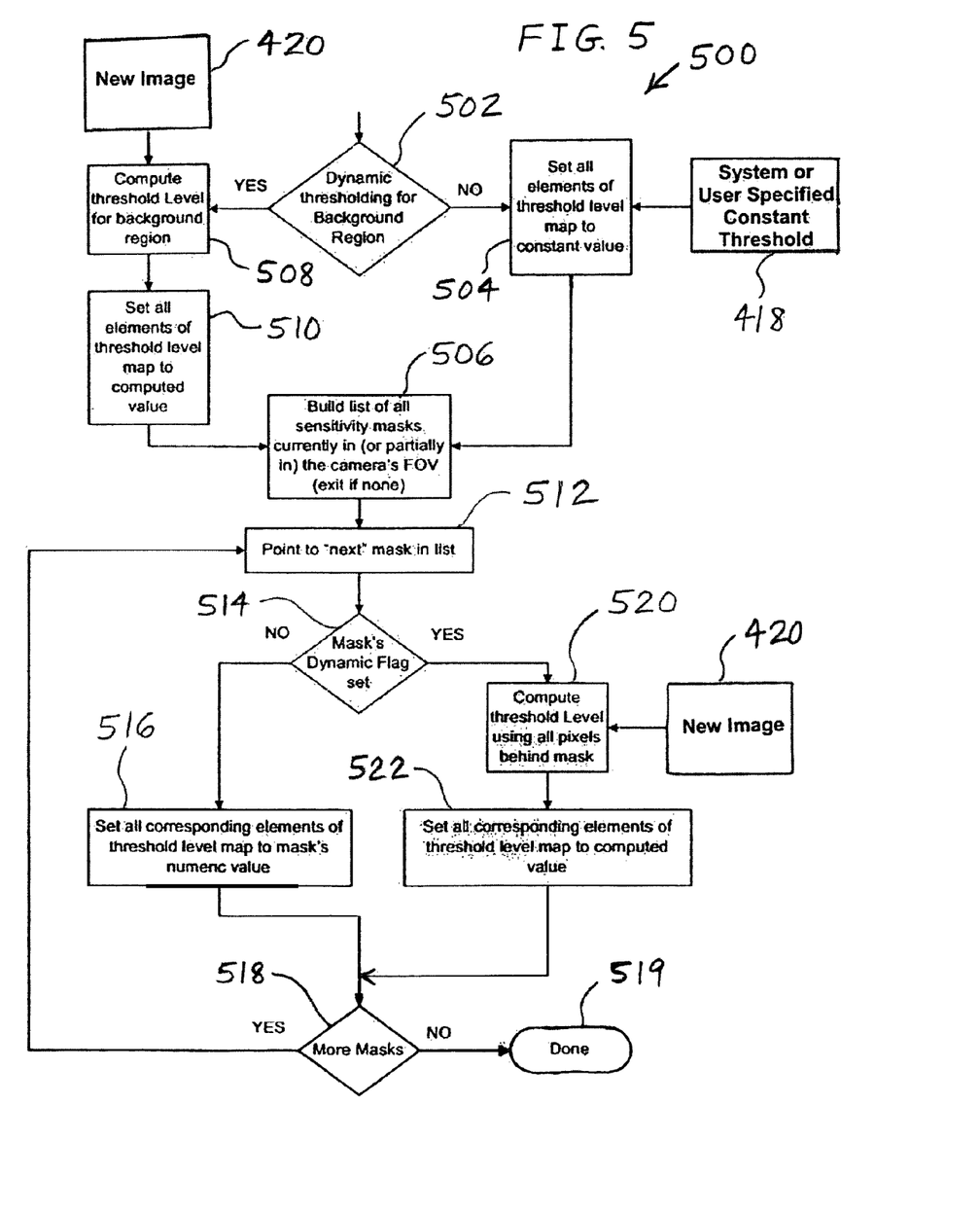
FIG. 5 is a flow diagram illustrating one embodiment of the details of the Build Threshold Level Map block of FIG. 4.

FIG. 5 illustrates one embodiment of the details 500 of the Build Threshold Level Map block 416 of FIG. 4. In a first step 502 it is decided whether dynamic thresholding is to be used for background region 52. This may be a decision that an installer makes based upon the characteristics of the background region of the field of view. In one embodiment, the decision is made automatically by the system itself, perhaps based upon pixel color values of the background region in images captured during a system initialization process. For example, if there is a relatively large range of brightness within background region 52, then use of a dynamic threshold may be more likely to accurately detect motion within the background region. If it is determined in step 502 that a dynamic threshold will not be used in background region 52, then all elements of the threshold level map are set to a constant value in step 504. Specifically, a system-specified or user-specified constant threshold value 418 may be applied to all elements of the threshold level map. Next, in step 506, a list of all sensitivity masks that are currently partially or entirely within the camera's field of view is built. If there are no sensitivity masks within the camera's field of view, then a constant threshold value is used throughout the threshold level map, and thus operation exits step 506 without action.

If it is decided in step 502 that dynamic thresholding can be used for the background region, then in step 508 the threshold level value for the background region is computed based upon new image 420. Next, in step 510, all elements of the threshold level map are set to the value computed in step 508. Although the computed threshold value will later be replaced with another threshold value within each of the sensitivity masks, the computed threshold value may be assigned to the entire threshold level map initially for purposes of computational efficiency and simplicity. Operation continues to step 506 wherein a list of all sensitivity masks that are currently partially or entirely within the camera's field of view is built.

After the list of sensitivity masks that are at least partially within the camera's field of view is compiled (regardless of whether dynamic thresholding is used for the background region), then a "next" mask in the list is pointed to in step 512. That is, software may point to a memory location at which the mask is described. If operation is proceeding to step 512 from step 506, then the "next" mask may be an initial mask in the list. In a next step 514, it is determined whether the dynamic flag of the "next" mask is set. If not, then operation proceeds to step 516 in which all corresponding elements of the threshold level map are set to the mask's numeric value. That is, a single mask may have only a single threshold value associated with it, and that single threshold value may be assigned to all elements of the threshold level map that correspond to the mask. Next, in step 518, it is determined whether there exists another sensitivity mask that corresponds to the camera's field of view. If not, then the process of building a threshold level map is complete, as indicated at step 519. If another sensitivity mask does exist, then operation returns to step 512 wherein a next map in the list is pointed to, and in step 514 it is determined whether the dynamic flag of the next mask is set.

If it is determined in step 514 that a mask's dynamic flag is set, regardless of whether it is an initial mask on the list or a subsequent mask on the list, then, in step 520, the threshold level is computed using all pixels "behind", i.e., corresponding to, the mask. For example, if in the most recently acquired image the pixels corresponding to the mask have generally high brightness values, then it may be assumed that the color values associated with the pixels have a wide range of values. Thus, the difference between the color values of these pixels in sequentially captured images may tend to have a wide range. Consequently, in order to prevent the system from being too sensitive to movement within the mask area, the threshold value of the mask may be assigned a relatively high value. Conversely, if in the most recently acquired image the pixels corresponding to the mask have generally low brightness values, then it may be assumed that the color values associated with the pixels have a narrow range of values. Thus, the difference between the color values of these pixels in sequentially captured images may tend to have a narrow range. Consequently, in order to make the system sufficiently sensitive to movement within the mask area, the threshold value of the mask may be assigned a relatively low value.

After the threshold level has been computed in step 520, all corresponding elements of the threshold level map are set to the computed value in step 522. Operation then continues to step 518, and the above-described process continues until the process of building a threshold level map is complete, as indicated at step 519.

Figure 6:
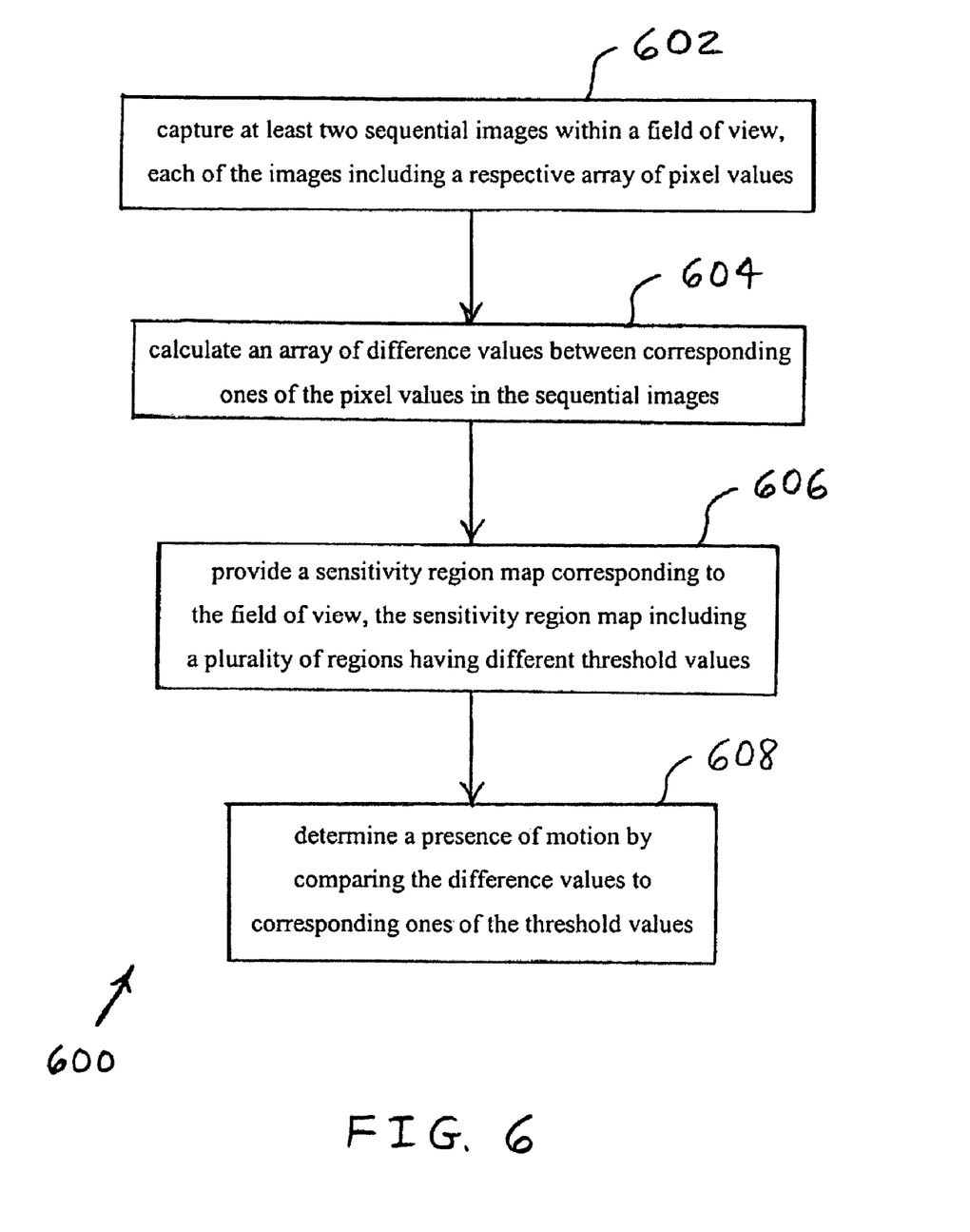
FIG. 6 is a flow chart of one embodiment of a method of the present invention for identifying motion within a field of view.

FIG. 6 illustrates one embodiment of a method 600 of the present invention for identifying motion within a field of view. In a first step 602, at least two sequential images within a field of view are captured, wherein each of the images includes a respective array of pixel values. For example, camera 22 may capture two images sequentially in time. Typically, the time elapsed between the two image captures is less than one second. Each of the images may be formed of a two-dimensional array of columns and rows of pixels each having a respective pixel value. In a next step 604, an array of difference values between corresponding ones of the pixels values in the sequential images is calculated. That is, a respective difference value is calculated between each corresponding pair of pixel values in the two images. The difference values may be arranged in a two-dimensional array of columns and rows wherein the location of each difference value in the array corresponds to the location of the associated pixel values in their arrays. In step 606, a Sensitivity Region Map corresponding to the field of view is provided, wherein the Sensitivity Region Map includes a plurality of regions having different threshold values. In the embodiments illustrated herein, Sensitivity Region Map 49 corresponding to field of view 50 is provided, wherein Sensitivity Region Map 49 includes regions in the form of mask A and mask B having different threshold values as included in threshold level map 44. In a final step 608, a presence of motion is determined by comparing the difference values to corresponding ones of the threshold values. For example, a presence of motion may be determined by comparing difference values calculated in image differencing process 38 to corresponding threshold values from threshold map 44, as in threshold difference image process 42.

Figure 7:
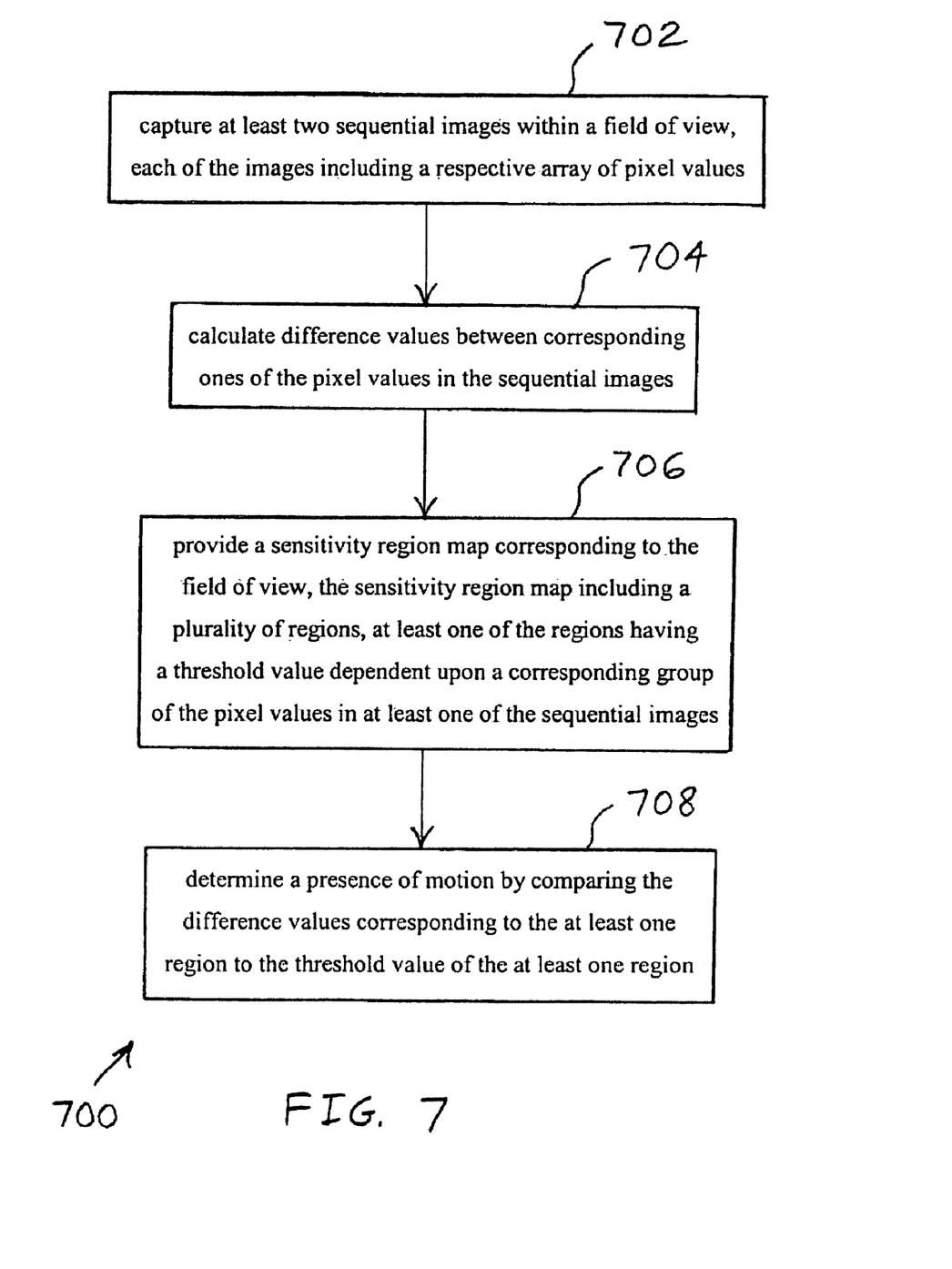
FIG. 7 is a flow chart of another embodiment of a method of the present invention for identifying motion within a field of view.

FIG. 7 illustrates another embodiment of a method 700 of the present invention for identifying motion within a field of view. In a first step 702, at least two sequential images within a field of view are captured, wherein each of the images includes a respective array of pixel values. For example, camera 22 may capture two images sequentially in time. Typically, the time elapsed between the captures of the two images is less than one-tenth of a second. Each of the images may be formed of a two-dimensional array of columns and rows of pixels each having a respective pixel value. In a next step 704, difference values between corresponding ones of the pixels values in the sequential images are calculated. That is, a respective difference value is calculated between each corresponding pair of pixel values in the two images. In step 706, a Sensitivity Region Map corresponding to the field of view is provided, wherein the Sensitivity Region Map includes a plurality of regions, at least one of the regions having a threshold value dependent upon a corresponding group of the pixel values in at least one of the sequential images. In the embodiments illustrated herein, Sensitivity Region Map 49 corresponding to field of view 50 is provided, wherein Sensitivity Region Map 49 includes regions in the form of mask A and mask B, mask A having a threshold value dependent upon a corresponding group of the pixel values in a most recent one of the sequential images. That is, the threshold value of mask A may be dependent upon the brightness values in an image portion corresponding to mask A in the last image captured. In a final step 708, a presence of motion is determined by comparing the difference values corresponding to the at least one region to the threshold value of the at least one region. For example, a presence of motion may be determined by comparing difference values corresponding to mask A to the threshold value of mask A.

Figure 8:
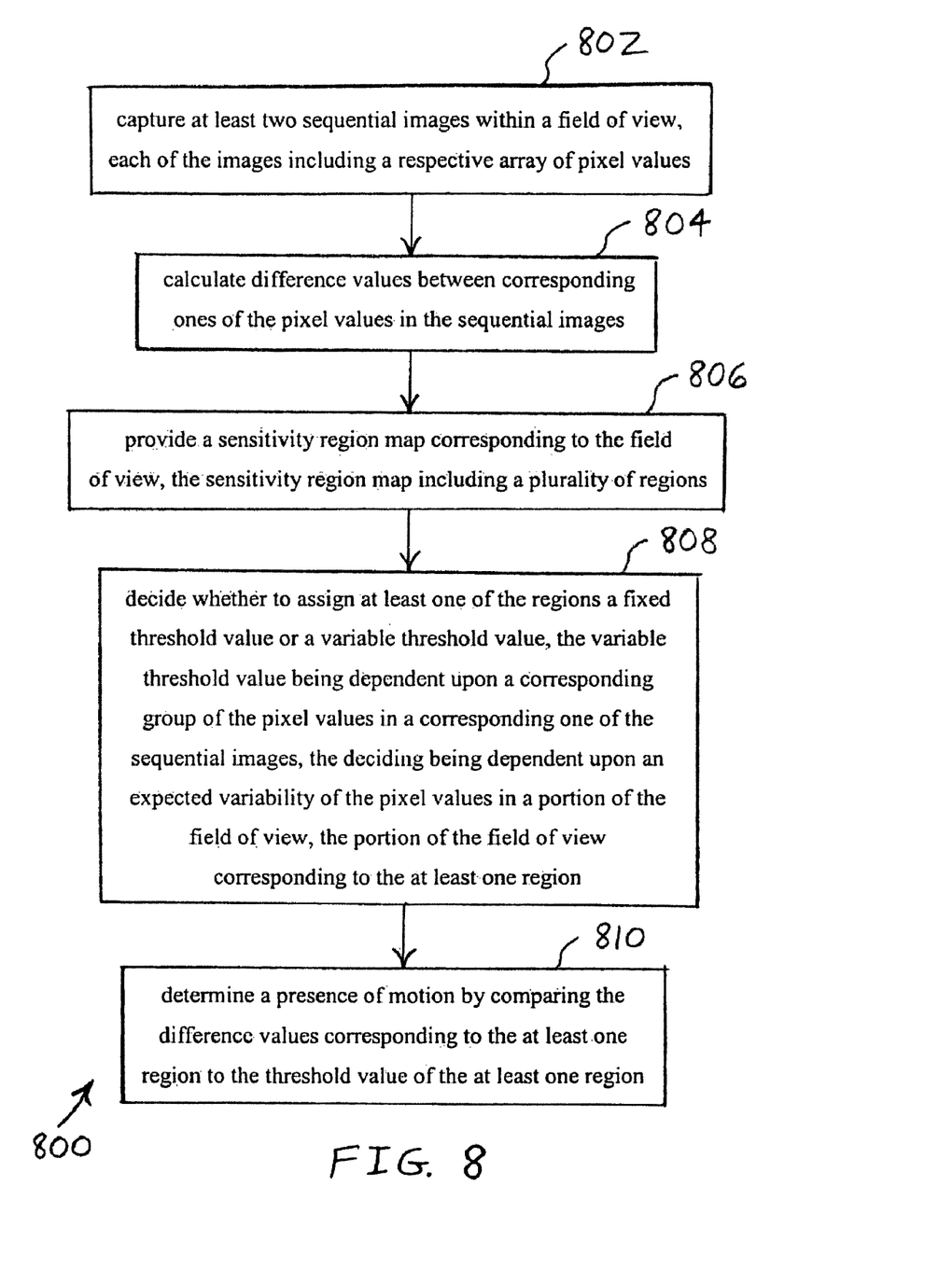
FIG. 8 is a plan view of yet another embodiment of a method of the present invention for identifying motion within a field of view.

FIG. 8 illustrates yet another embodiment of a method 800 of the present invention for identifying motion within a field of view. In a first step 802, at least two sequential images within a field of view are captured, wherein each of the images includes a respective array of pixel values. For example, camera 22 may capture two images sequentially in time. Typically, the time elapsed between the two image captures is less than one second. Each of the images may be formed of a two-dimensional array of columns and rows of pixels each having a respective pixel value. In a next step 804, difference values between corresponding ones of the pixels values in the sequential images are calculated. That is, a respective difference value is calculated between each corresponding pair of pixel values in the two images. In step 806, a Sensitivity Region Map corresponding to the field of view is provided, wherein the Sensitivity Region Map includes a plurality of regions. In the embodiments illustrated herein, Sensitivity Region Map 49 corresponding to field of view 50 is provided, wherein Sensitivity Region Map 49 includes regions in the form of mask A and mask B. In step 808, it is decided whether to assign at least one of the regions a fixed threshold value or a variable threshold value, the variable threshold value being dependent upon a corresponding group of the pixel values in a corresponding one of the sequential images, the decision being dependent upon an expected variability of the pixel values in a portion of the field of view that corresponds to the at least one region. For example, it may be decided whether to assign mask A a fixed threshold value or a variable threshold value, wherein the variable threshold value is dependent upon pixels corresponding to mask A in a most recently acquired image. The decision whether to assign mask A a fixed threshold value or a variable threshold value may be dependent upon whether the portion of the field of view corresponding to mask A is expected to be subject to widely varying lighting conditions. In a final step 810, a presence of motion is determined by comparing the difference values corresponding to the at least one region to the threshold value of the at least one region. In a particular example, a presence of motion in a portion of the field of view corresponding to mask A may be determined by comparing the difference values corresponding to mask A to the threshold value of mask A.

The present invention has been described herein as being applied to setting threshold values for polygon-shaped masks within a Sensitivity Region Map. However, the scope of the present invention is broad enough to encompass masks of any shape. For example, the surveillance system may empirically determine during an initialization process or during operation that the color values of certain pixels have characteristics that are different from the characteristics of the color values of other pixels. The surveillance system may assign threshold values on a pixel-by-pixel basis according to the unique characteristics of the color value of each individual pixel. That is, it is not necessary within the scope of the invention for pixels corresponding to a same threshold value to be located within a same area of the field of view. However, it is also possible within the scope of the invention for the system to create masks characterized by a single threshold value wherein the mask is continuous and may have any regular or irregular shape. The system may create such masks based upon the color values of captured images. Thus, the shapes of the masks could possibly evolve with each newly captured image. In one embodiment, the boundaries of the masks or regions are automatically moved or adjusted during surveillance operation base upon empirically measured pixel values of the captured images.

While this invention has been described as having an exemplary design, the present invention may be further modified within the spirit and scope of this disclosure. This application is therefore intended to cover any variations, uses, or adaptations of the invention using its general principles.

What is claimed is:

1. A method of identifying motion within a field of view, the method comprising the steps of:
    capturing at least two sequential images within the field of view, each of the images including a respective array of pixel values;
    calculating an array of difference values between corresponding ones of the pixel values in the sequential images;
    providing a sensitivity region map corresponding to the field of view, the sensitivity region map including a plurality of regions having different threshold values, the plurality of regions including at least one polygon-shaped region and a background region, at least one of the regions including a variable threshold value, the variable threshold value being dependent upon a corresponding group of the pixel values in a corresponding one of the sequential images; and
    determining a presence of motion by comparing the difference values to corresponding ones of the threshold values.

2. The method of claim 1 wherein the determining step includes determining a presence of motion by comparing the difference values corresponding to one of the regions to a selected said threshold value of the region.

3. The method of claim 1 comprising the further steps of:
    identifying a portion of the field of view having a higher expected variability of pixel values than another portion of the field of view; and
    locating the at least one of the regions in correspondence with the portion of the field of view having a higher expected variability of pixel values.

4. A method of identifying motion within a field of view, the method comprising the steps of:
    capturing at least two sequential images within the field of view, each of the images including a respective array of pixel values;
    calculating difference values between corresponding ones of the pixel values in the sequential images;
    providing a sensitivity region map corresponding to the field of view, the sensitivity region map including a plurality of regions, the plurality of regions including at least one polygon-shaped region and a background region, at least one of the regions having a variable threshold value dependent upon a corresponding group of the pixel values in at least one of the sequential images; and determining a presence of motion by comparing the difference values corresponding to the at least one region to the threshold value of the at least one region.

5. The method of claim 1 comprising the further steps of:

selecting a first threshold value more suitable for determining a presence of vehicle motion than for determining a presence of pedestrian motion;

identifying a first portion of the field of view having at least one of a higher likelihood of vehicle motion and a lower likelihood of pedestrian motion than a second portion of the field of view; and assigning the first threshold value to a first region of the sensitivity region map corresponding to the first portion of the field of view, the first threshold value being greater than a second threshold value assigned to a second region of the sensitivity region map corresponding to the second portion of the field of view.

6. A method of identifying motion within a field of view, the method comprising the steps of:

capturing at least two sequential images within the field of view, each of the images including a respective array of pixel values;

calculating difference values between corresponding ones of the pixel values in the sequential images;

providing a sensitivity region map corresponding to the field of view, the sensitivity region map including a plurality of regions, the plurality of region including at least one polygon-shaped region and a background region, at least one of the regions having a variable threshold value dependent upon a corresponding group of the pixel values in at least one of the sequential images; and determining a presence of motion by comparing the difference values corresponding to the at least one region to the threshold value of the at least one region.

7. A method of identifying motion within a field of view, the method comprising the steps of:

capturing at least two sequential images within the field of view, each of the images including a respective array of pixel values;

calculating difference values between corresponding ones of the pixel values in the sequential images;

providing a sensitivity region map corresponding to the field of view, the sensitivity region map including a plurality of regions, the plurality of regions including at least one polygon-shaped region and a background region;

deciding whether to assign at least one of the regions a fixed threshold value or a variable threshold value, the variable threshold value being dependent upon a corresponding group of the pixel values in a corresponding one of the sequential images, the deciding being dependent upon an expected variability of the pixel values in a portion of the field of view, the portion of the field of view corresponding to the at least one region; and determining a presence of motion by comparing the difference values corresponding to the at least one region to the threshold value of the at least one region.

8. The method of claim 6 comprising the further step of selecting the corresponding group of pixel values based upon the corresponding group of pixel values having a higher expected variability between subsequent sequential images than another group of pixel values in the at least one of the sequential images.

9. The method of claim 6 wherein another one of the regions has a fixed threshold value.

10. The method of claim 9 wherein the fixed threshold value is selected to be more suitable for determining a presence of a first type of motion than for determining a presence of a second type of motion;

identifying a first portion of the field of view having at least one of a higher likelihood of the first type of motion and a lower likelihood of the second type of motion than a second portion of the field of view; and assigning the selected fixed threshold value to a first region of the sensitivity region map corresponding to the first portion of the field of view.

11. A method of identifying motion within a field of view, the method comprising the steps of:

capturing at least two sequential images within the field of view, each of the images including a respective array of pixel values;

calculating difference values between corresponding ones of the pixel values in the sequential images;

providing a sensitivity region map corresponding to the field of view, the sensitivity region map including a plurality of regions, the plurality of region including at least one polygon-shaped region and a background region;

deciding whether to assign at least one of the regions a fixed threshold value or a variable threshold value, the variable threshold value being dependent upon a corresponding group of the pixel values in a corresponding one of the sequential images, the deciding being dependent upon an expected variability of the pixel values in a portion of the field of view, the portion of the field of view corresponding to the at least one region; and determining a presence of motion by comparing the difference values corresponding to the at least one region to the threshold value of the at least one region.

12. The method of claim 11 wherein the deciding step includes deciding to assign a variable threshold value to a first of the regions, and deciding to assign a fixed threshold value to a second of the regions, a first expected variability of the pixel values in a first portion of the field of view corresponding to the first region being greater than a second expected variability of the pixel values in a second portion of the field of view corresponding to the second region.

13. The method of claim 12 wherein the second of the regions comprises a background region substantially surrounding the first of the regions.

14. The method of claim 12, comprising the further step of selecting the fixed threshold value dependent upon a size of a body whose motion is desired to be detected.

15. The method of claim 11 wherein the variable threshold value varies dependent upon brightness values in at least one subsequent one of the sequential images.

16. The method of claim 11 wherein boundaries of the regions are automatically moved during operation based upon empirically measured pixel values of the captured images.

* * * * *